Jan. 31, 1939. T. E. McDOWELL 2,145,424
SELF-EXCITED ALTERNATING CURRENT MACHINE
Original Filed March 27, 1935
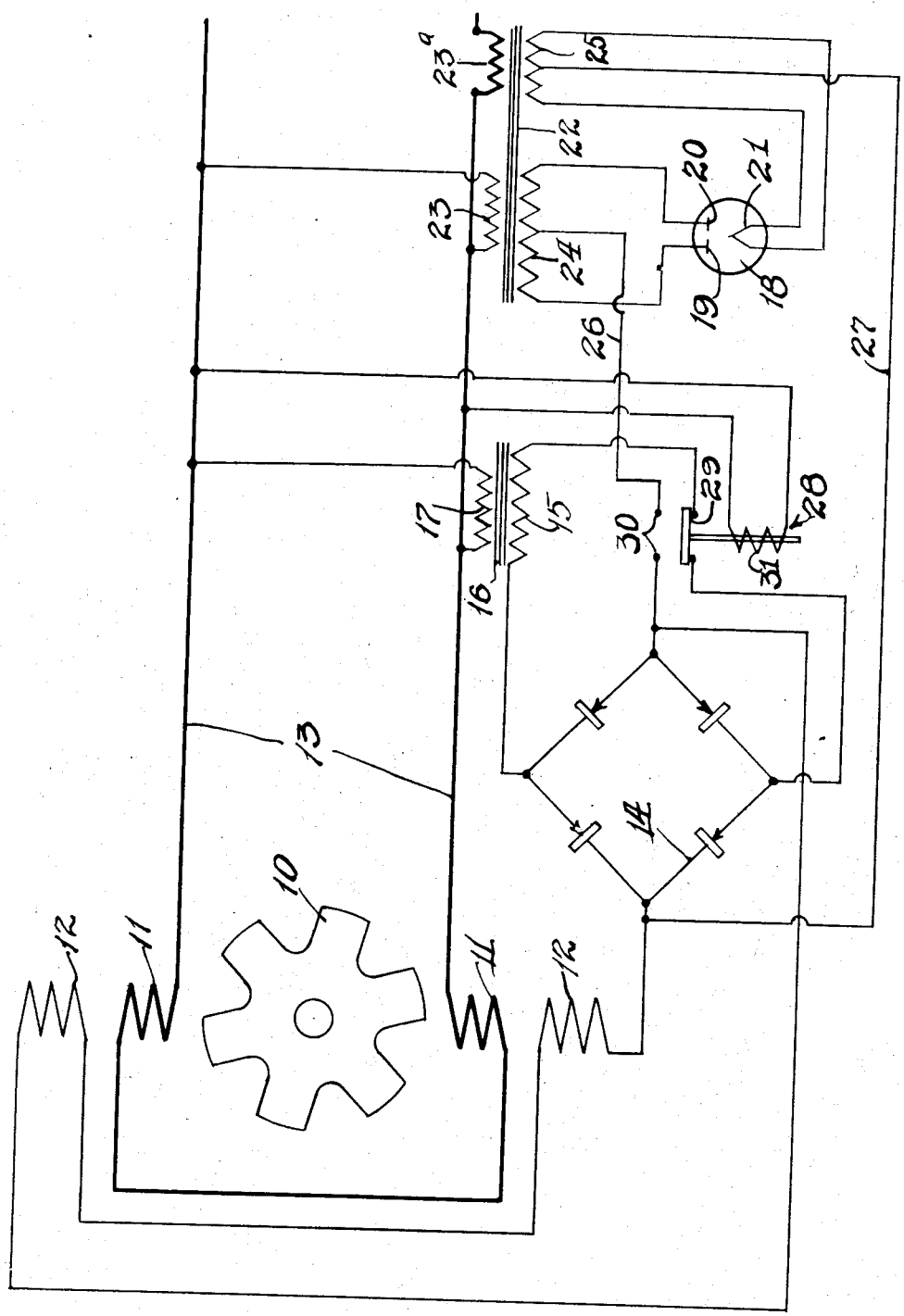
Inventor
Thomas E. McDowell
by Charles ONeill Attys.

Patented Jan. 31, 1939

2,145,424

UNITED STATES PATENT OFFICE 2,145,424

SELF-EXCITED ALTERNATING CURRENT MACHINE

Thomas E. McDowell, Chicago, Ill., assignor to The Pyle-National Company, Chicago, Ill., a corporation of New Jersey Original application March 27, 1935, Serial No. 13,190. Divided and this application July 13, 1936, Serial No. 90,274

2 Claims. (Cl. 171—119)

The present invention relates in general to alternating current machines, and is principally concerned with the provision of improved means for excitation of the field coils of the machine. The invention described herein constitutes a division of my copending application Serial No. 13,190, filed March 27, 1935.

The present invention is particularly adapted for use in train lighting systems, and especially for the furnishing of power for the headlight of the locomotive. On the other hand, it will be appreciated by those skilled in the art that it may with equal facility be utilized for other purposes where the generation of electricity is required, and moreover, although the invention is disclosed as being embodied in a single phase apparatus, it is contemplated that the principles of the invention may likewise be embodied in apparatus adapted for multiphase operation.

Heretofore, direct current generators operated by a suitable prime mover have been used for furnishing power to the headlights of locomotives, and while these machines had very desirable operating characteristics, they were particularly objectionable from the standpoint of maintenance and servicing, since the direct current generators necessitated the use of brushes. These brushes, due to wear, oftentimes required replacement under conditions where skilled or suitable labor either was not present or not readily obtainable.

To overcome this disadvantage and other objections, attempts were made to utilize alternating current generators, and in order to get away from the use of brushes, exciters, etc., the field coils were replaced by permanent magnets. The disadvantage of this arrangement was that the regulation efficiency of the machine was materially decreased as it became loaded.

The present invention seeks to provide an alternating current machine which is self-excited, thus doing away with the use of brushes and separate exciters; a machine embodying the operating advantages of a direct current generator; a generator which is simple in construction, being devoid of a large number of moving parts; and which may be simply and easily arranged to have shunt or compound characteristics, as desired, to the end that its characteristics may be readily varied to meet different operating conditions of load.

In accordance with the general features of the invention, it is proposed to provide, in the preferred form of the invention, an alternating current generator of the inductor type, having stationary alternating current armature coils, direct current field coils, and a simple toothed rotor without windings. The alternating current armature coils are arranged for connection to a delivery circuit, and the direct current field coils are arranged to be excited through a suitable rectifier from the alternating current delivery circuit.

Since, in the above arrangement, the generator will build up from its residual field, it is preferred that a rectifier of the cold type be utilized for furnishing direct current to the field. It has been found that the copper oxide, electrolytic, and other similar types of rectifiers are admirably adapted for this purpose. Where the generator, as in this case, is built up from residual, the thermionic or vacuum tube type of rectifier would be inoperative until the rated voltage was applied, unless the filament were heated at the start, which of course would be impractical. However, the present invention contemplates that during the initial period of generation a cold type of rectifier, such as the copper oxide type, may be used, and automatic switching means provided for subsequently throwing the excitation to a rectifier of the thermionic or vacuum tube type.

As an added feature of the invention, the above arrangement for exciting the field is admirably adapted to effect compound or shunt operating characteristics, as desired. For compound characteristics, it is proposed to provide in the transformer for the running rectifier a potential primary winding and also a current primary winding, the potential winding being connected across the delivery circuit, whereas the series winding is connected in the delivery circuit, so that the load current passes therethrough. The secondary coil of the transformer is connected to the supply side of the rectifier. It will therefore be evident that as the load changes the excitation of the direct current field will be increased an amount determined by the design of the transformer windings. Without the series primary winding of the transformer, the characteristics will be similar to a direct current generator of the shunt type.

Although the invention is disclosed primarily in connection with a generator, it is contemplated that it may also be embodied in certain types of alternating current motors.

Other objects and features of the invention will more fully appear from the following detailed description, taken in connection with the accompanying drawing.

The drawing diagrammatically illustrates the invention as applied to an inductor type generator, and switching means for automatically transferring the field excitation from one type of rectifier to a different type of rectifier.

As shown on the drawing:

In the illustrated embodiment of the invention as shown, the invention is disclosed as embodying an alternating current generator of the inductor type, and including a toothed rotor 10 which is devoid of windings, and a stator having alternating current coils 11—11 and direct current coils 12—12.

While it is not primarily essential to the practice of the present invention that the foregoing type of generator be utilized, an inductor type generator is preferred, since there are no rotatable parts carrying windings which might be subject to damage due to centrifugal action, and this type of generator is, moreover, devoid of brushes which would have to be replaced from time to time as they become worn.

The alternating current is generated in the coils 11—11, and these coils are connected to feed a delivery circuit, indicated at 13. This circuit in the present instance is shown as being single phase, but it will be obvious that a multi-phase delivery circuit may be used with equal facility, without interfering in any manner with the practice of the present invention.

For exciting the field winding, it is proposed to utilize a rectifier which may be fed or energized from the alternating current delivery circuit of the generator. Since, in the proposed arrangement, the generator will have to build up from residual field magnetism, it is preferable to use a rectifier of the cold type, such as the copper oxide type, electrolytic type, and other similar types. Of course, once the generator has built up, it may be desirable under certain conditions to then supply the excitation from a hot type of rectifier, such as the thermionic or vacuum tube type. The vacuum tube type, containing a heated filament, is not desirable for initial building up of the generator, since the generator output is very low, and it requires some time for the filament of the tube rectifier to be heated sufficiently to function properly.

In the embodiment of the invention as shown, initial excitation of the field coils 12—12 is accomplished by a bridge rectifier, as shown at 14, this rectifier being of the cold type. The rectifier 14 is energized from the secondary winding 15 of the transformer 16 having a primary coil 17 which is connected across the delivery circuit 13 of the generator. Of course, if the delivery voltage of the generator is sufficiently low, this rectifier may be connected directly to the delivery circuit, without using a transformer.

For subsequently exciting the coils 12—12, after the generator has built up, there is provided a rectifier of the hot or thermionic type which comprises a rectifier tube 18 which is provided with two anodes 19 and 20 and the usual filament 21. This rectifier is energized from a transformer 22 having a primary composed of a voltage winding 23 and a current winding 23ª, the former being connected across the delivery circuit 13 of the generator and the latter in series therein. The secondary of the transformer 22 is provided with two windings, namely, a winding 24 which has its terminals respectively connected to the anodes 19 and 20 of the rectifier tube, and a winding 25 which has its end terminals connected to the filament 21. Output from the rectifier is obtained through conductors 26 and 27, which are respectively connected to the mid-points of windings 24 and 25.

For automatically transferring the excitation from the rectifier 14 to rectifier tube 18, there is provided a relay 28 having normally closed contacts 29 and normally opened contacts 30. The relay is actuated by means of a coil 31, which in this instance is a potential coil connected across the delivery circuit 13 and arranged to operate the relay when a predetermined value of potential across the delivery circuit is reached. It is obvious that the operating coil of this relay may be designed to operate on current rather than voltage, and may be energized in response to some other characteristic of the generator; for example, the coil could be in the field circuit and arranged to operate the relay when the field current reaches a predetermined value.

In its normal position, contacts 29 are closed, and are so arranged as to close the energizing circuit of rectifier 14 from the secondary winding 15 of its associated transformer. When the generator has built up so as to supply a predetermined potential on the delivery circuit, the relay operates to close contacts 30, which are in the output circuit of the rectifier tube 18, this action at the same time disconnecting the energizing circuit of rectifier 14.

The series winding 23ª of the supply transformer for the rectifier used during normal operation of the generator will vary the excitation of the field winding in accordance with load variations on the generator. This arrangement provides a very simple method of securing compound operation of the generator without the necessity of providing an additional auxiliary field winding.

In the drawing and description, rectifiers have been disclosed of the full wave rectifying type. It is contemplated, however, that the invention is not to be limited to the use of full wave rectification, but that half wave rectification might be used with equal facility, if desired.

From the foregoing description, it will be apparent that the present invention provides an alternating current machine which is self-excited, doing away with the use of brushes and a separate exciter; which embodies the operating advantages of direct current generators; which is simple in construction and devoid of a large number of moving parts; which may be simply and easily arranged to have shunt or compound characteristics, as desired, and which is so arranged that its field winding may be initially excited through rectifying means having certain characteristics, and thereafter through rectifying means having different characteristics.

I claim as my invention:

1. In combination, an alternator having a field structure, a field winding, and an armature winding, a first field excitation means adapted to function with the voltage due to the residual magnetism of the field structure to build up the field magnetism, said first excitation means comprising a rectifier of the cold type connected with said armature winding and with said field winding, a second field excitation means adapted to function after the excitation has been materially increased by said first excitation means, said second excitation means having a filament connected with said armature to be heated as the alternator builds up its voltage, said second excitation means comprising a thermionic rectifier including an anode energizable by said armature winding and connectible to said field winding, and means responsive to the voltage of the alternator to transfer the excitation duty from said first to said second excitation means.

2. In combination, an alternator having a field structure, a direct current field winding, and an armature winding, a first field excitation means adapted to function with the voltage due to the residual magnetism of the field structure to build up the field magnetism, said first excitation means comprising a rectifier of the cold type connected with said armature winding and with said field winding, a second field excitation means connectible with said armature and said field winding and adapted to function after the excitation has been materially increased by said first excitation means, said second excitation means comprising a thermionic rectifier including a cathode and an anode, transformer means interposed between said armature winding and said thermionic rectifier for energization of the cathode and anode of said rectifier, means responsive to the voltage of the alternator to transfer the excitation duty from said first to said second excitation means, said transformer having a core provided with a first primary winding connected in parallel with said armature and also provided with a second primary winding connected in series with said armature.

THOMAS E. McDOWELL.